US011879480B1

(12) United States Patent
Engebretsen et al.

(10) Patent No.: US 11,879,480 B1
(45) Date of Patent: Jan. 23, 2024

(54) SECTIONED COMPRESSOR INNER BAND FOR VARIABLE PITCH VANE ASSEMBLIES IN GAS TURBINE ENGINES

(71) Applicants: Rolls-Royce North American Technologies Inc., Indianapolis, IN (US); Rolls-Royce Corporation, Indianapolis, IN (US)

(72) Inventors: Eric Engebretsen, Indianapolis, IN (US); Christopher Hall, Indianapolis, IN (US); Erick Meyer, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/132,177

(22) Filed: Apr. 7, 2023

(51) Int. Cl.

| | |
|---|---|
| ***F04D 29/56*** | (2006.01) |
| ***F04D 29/54*** | (2006.01) |
| ***F04D 29/02*** | (2006.01) |
| ***F04D 19/00*** | (2006.01) |

(52) U.S. Cl.
CPC ......... *F04D 29/563* (2013.01); *F04D 29/542* (2013.01); *F04D 19/002* (2013.01); *F04D 29/023* (2013.01); *F05D 2230/20* (2013.01); *F05D 2240/12* (2013.01)

(58) Field of Classification Search
CPC .... F04D 19/002; F04D 29/023; F04D 29/542; F04D 29/563; F05D 2230/20; F05D 2240/12
See application file for complete search history.

(56) References Cited

U.S. PATENT DOCUMENTS 4,395,195 A * 7/1983 De Cosmo ............ F01D 17/162 415/137
5,062,767 A 11/1991 Worley et al.
5,421,703 A 6/1995 Payling
5,681,142 A * 10/1997 Lewis ..................... F01D 9/042 415/209.3
6,129,512 A 10/2000 Agram et al.
6,413,043 B1 7/2002 Bouyer
6,790,000 B2 9/2004 Wolf
7,713,022 B2 5/2010 Major et al.
7,753,647 B2 7/2010 Gaimo et al.
8,328,512 B2 12/2012 Major et al.
8,376,692 B2 2/2013 Stiehler
8,500,394 B2 8/2013 Major
(Continued)

FOREIGN PATENT DOCUMENTS

CN 110761848 A * 2/2020 ............. F01D 9/042

OTHER PUBLICATIONS

Bob Vila, "How To: Remove Rivets," archived as early as Jul. 29, 2016 (Year: 2016).*

*Primary Examiner* — Audrey B. Walter
(74) *Attorney, Agent, or Firm* — Barnes & Thornburg LLP

(57) ABSTRACT

A compressor assembly for a gas turbine engine includes an outer band, a plurality of variable pitch vanes, and an inner band. The plurality of variable pitch vanes extend radially between the outer band and the inner band. The inner band extends circumferentially partway about an axis and includes a first ring segment and a second ring segment that cooperate to receive the plurality of variable pitch vanes.

19 Claims, 5 Drawing Sheets

(56) References Cited

U.S. PATENT DOCUMENTS

| | | | |
|---|---|---|---|
| 8,951,010 B2 | 2/2015 | Major et al. | |
| 9,587,499 B2 | 3/2017 | Albers et al. | |
| 9,605,549 B2 | 3/2017 | Humhauser | |
| 9,926,944 B2 | 3/2018 | Mouton et al. | |
| 10,066,668 B2 | 9/2018 | Zotz | |
| 10,082,036 B2 | 9/2018 | Vest | |
| 10,107,122 B2 | 10/2018 | Maliniak | |
| 10,174,628 B2 | 1/2019 | Humhauser et al. | |
| 10,494,944 B2 | 12/2019 | Humhauser | |
| 10,626,742 B2 | 4/2020 | Albers et al. | |
| 10,662,814 B2 | 5/2020 | Maliniak | |
| 10,858,959 B2 | 12/2020 | Maar | |
| 11,156,127 B2 | 10/2021 | Albers et al. | |
| 11,168,574 B2 | 11/2021 | Schwarz et al. | |
| 11,359,509 B1 | 6/2022 | O'Brien | |
| 11,549,388 B2 | 1/2023 | Faisal et al. | |
| 2014/0140822 A1 | 5/2014 | Capozzi et al. | |
| 2016/0010488 A1 | 1/2016 | Albers et al. | |
| 2016/0237855 A1* | 8/2016 | Humhauser | F04D 29/563 |
| 2018/0112555 A1 | 4/2018 | Humhauser | |
| 2020/0224545 A1* | 7/2020 | Patel | F01D 11/08 |

* cited by examiner

SECTIONED COMPRESSOR INNER BAND FOR VARIABLE PITCH VANE ASSEMBLIES IN GAS TURBINE ENGINES

FIELD OF THE DISCLOSURE

The present disclosure relates generally to gas turbine engines, and more specifically to inner vane bands for compressors in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Some vane assemblies include variable pitch vanes configured to selectively turn and vary their pitch angle to control the air flow exiting the vane assembly. It can be desirable to provide variable pitch vane assemblies with inner bands that ease assembly of the components into the vane assemblies.

SUMMARY

The present disclosure may comprise one or more of the following features and combinations thereof.

According to an aspect of the present disclosure, a compressor assembly for a gas turbine engine includes an outer band, a plurality of variable pitch vanes, and an inner band. The outer band extends at least partway circumferentially around a central axis to define an outer boundary of a gas path of the compressor assembly. The plurality of variable pitch vanes are configured to vary a direction of a gas flowing through the gas path of the compressor assembly. Each of the plurality of variable pitch vanes extends radially inward from the outer band relative to the central axis. Each of the plurality of variable pitch vanes is configured to rotate about a pitch axis that extends radially outward from the central axis and through the corresponding variable pitch vane included in the plurality of variable pitch vanes. The inner band extends circumferentially at least partway about the central axis to define an inner boundary of the gas path. The inner band formed to define a plurality of bearing apertures that each receive a portion of one of the plurality of variable pitch vanes.

The inner band includes a forward ring segment that extends partway circumferentially about the axis, an aft ring segment that extends partway circumferentially about the axis, and a rivet. The rivet extends axially entirely through the forward ring segment and the aft ring segment. At least one of a forward end and an aft end of the rivet is plastically deformed to couple the forward ring segment with the aft ring segment.

In some embodiments, the rivet includes a stem that extends axially between the forward end and the aft end of the rivet. The forward ring segment is formed to include a forward axial passage. The aft ring segment is formed to include an aft axial passage. The stem of the rivet extends axially through the forward axial passage and the aft axial passage. The stem, the forward axial passage, and aft axial passage are not threaded. In some embodiments, a layer of abradable material is coupled to a radial inner surface of the forward ring segment and a radial inner surface of the aft ring segment.

In some embodiments, one of the forward ring segment and the aft ring segment is formed to define a bore that extends axially into the one of the forward ring segment and the aft ring segment. The rivet includes a stem that extends axially through the forward ring segment and the aft ring segment and a head that is received in the bore to block axial movement of the rivet.

In some embodiments, the other one of the forward ring segment and the aft ring segment is formed to define a through hole. The stem of the rivet is plastically deformed and engages the other one of the forward ring segment and the aft ring segment to couple the forward ring segment with the aft ring segment. In some embodiments, at least one of the bore and the head of the rivet are non-circular when viewed axially to block rotation of the rivet along a longitudinal axis of the stem.

In some embodiments, the forward ring segment and the aft ring segment cooperate to define the plurality of bearing apertures and abut one another axially to couple the plurality of variable pitch vanes with the inner band. In some embodiments, an entire outer radial face of the forward ring segment and an entire outer radial face of the aft ring segment define the inner boundary.

In some embodiments, the rivet includes a stem, at least one of a forward end and an aft end that is plastically deformed to provide a first head of the rivet, and a second head provided at the other of the forward end and the aft end. The first head and the second head are spaced apart axially by a distance such that the first head and the second head apply an axially compressive force to the forward ring segment and the aft ring segment.

According to another aspect, a compressor assembly for a gas turbine engine includes a variable pitch vane and an inner band. The variable pitch vane extends radially relative to a central axis. The inner band includes a first ring segment, a second ring segment, and a rivet. The first ring segment extends partway circumferentially about the axis. The second ring segment extends partway circumferentially about the axis and abuts the first ring segment such that a portion of the variable pitch vane is received in the first ring segment and the second ring segment. The rivet extends axially through the first ring segment and the second ring segment to couple the first ring segment with the second ring segment.

In some embodiments, an end of the rivet is plastically deformed to couple the first ring segment with the second ring segment. In some embodiments, the rivet applies an axially compressive force to the first ring segment and the second ring segment. In some embodiments, a layer of abradable material is coupled to a radial inner surface of the first ring segment and a radial inner surface of the second ring segment.

In some embodiments, the first ring segment is formed to define a bore that extends axially into the first ring segment. The rivet includes a stem that extends axially through the first ring segment and the second ring segment and a head that is received in the bore to block axial movement of the rivet.

In some embodiments, an entire outer radial face of the first ring segment and an entire outer radial face of the second ring segment define an inner boundary of a gas path of the compressor assembly. In some embodiments, the rivet extends axially through the entire first ring segment and the entire second ring segment.

In some embodiments, the first ring segment includes a radial inner first surface and a radial inner second surface that is spaced apart radially from the radial inner first surface. A first layer of abradable material extends along the first surface and a second layer of abradable material extends along the second surface.

According to another aspect, a method of making a compressor assembly includes a number of steps. The method includes moving a first ring segment relative to a variable pitch vane such that the variable pitch vane is received in a first portion of a bearing aperture formed in the first ring segment, moving a second ring segment relative to the first ring segment such that the variable pitch vane is received in a second portion of the bearing aperture formed in the second ring segment, inserting a rivet axially through the first ring segment and the second ring segment, and plastically deforming an end of the rivet to couple the first ring segment with the second ring segment.

In some embodiments, the method includes applying a layer of abradable material to at least one of the first ring segment and the second ring segment. In some embodiments, the method includes machining the rivet and separating the rivet from the first ring segment and the second ring segment.

These and other features of the present disclosure will become more apparent from the following description of the illustrative embodiments.

DETAILED DESCRIPTION

Figure 1:
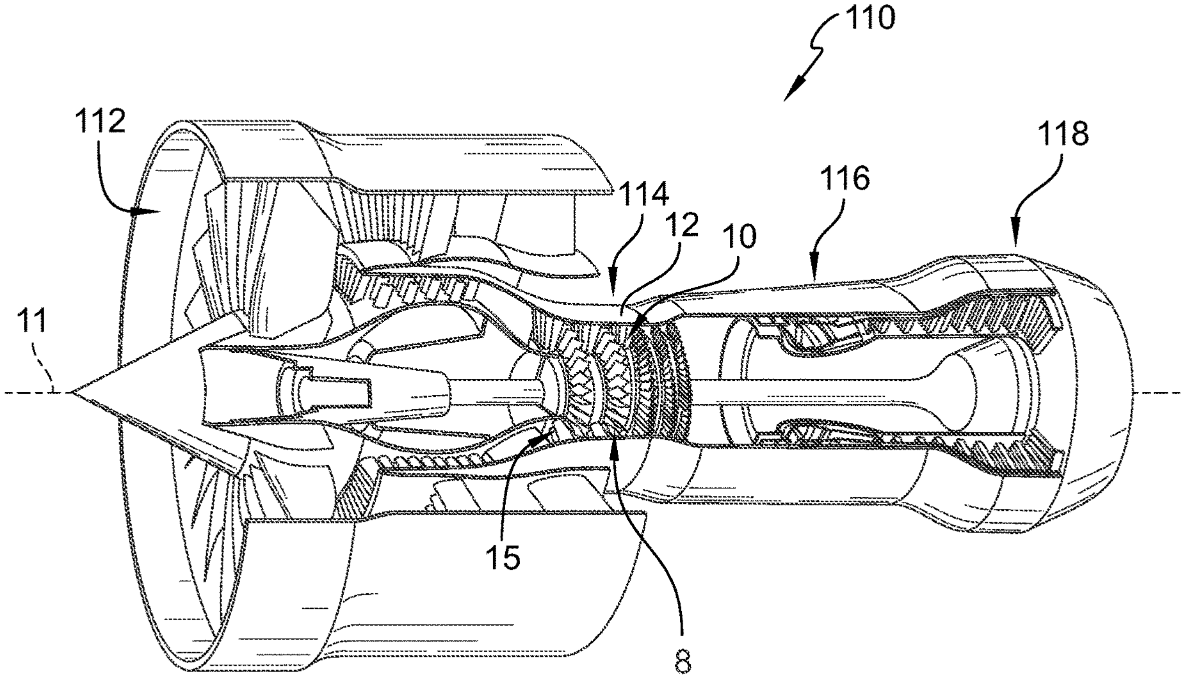
FIG. 1 is a perspective and cutaway view of a gas turbine engine having a fan, a compressor, a combustor, and a turbine.

For the purposes of promoting an understanding of the principles of the disclosure, reference will now be made to a number of illustrative embodiments illustrated in the drawings and specific language will be used to describe the same.

An illustrative gas turbine engine 110 includes a fan 112, a compressor 114, a combustor 116, and a turbine 118 as shown in FIG. 1. The fan 112 is driven by the turbine 118 and provides thrust for propelling an air vehicle, for example. The compressor 114 compresses and delivers pressurized air to the combustor 116. The combustor 116 mixes fuel with the compressed air received from the compressor 114 and ignites the fuel. The hot, high-pressure products of the combustion reaction in the combustor 116 are directed into the turbine 118. Rotation of the turbine 118 drives the compressor 114 and the fan 112.

Figure 2:
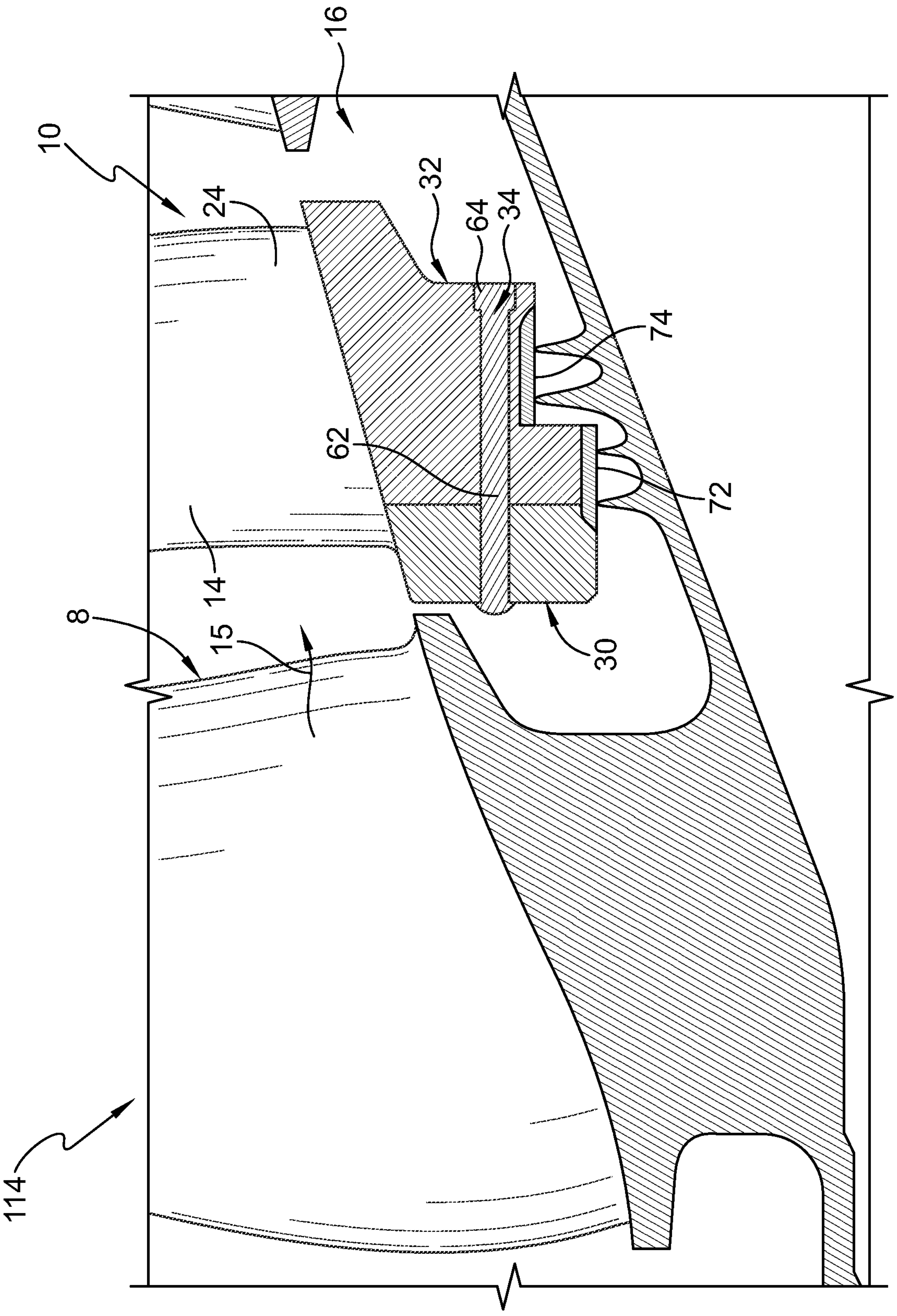
FIG. 2 is a section view of a portion of the compressor of the gas turbine engine of FIG. 1 showing the compressor includes a rotating wheel assembly having a plurality of airfoils and a variable vane assembly in accordance with the present located downstream of the rotating wheel assembly.

The compressor 114 includes a plurality of bladed wheels 8 and a plurality of variable pitch vane assemblies 10 (also called a compressor assembly 10 herein), among other possible components, as suggested in FIGS. 1 and 2. The bladed wheels 8 are configured to rotate about a central axis 11 and compress the pressurized air. The variable pitch vane assemblies 10 are configured to vary a direction of the pressurized air exiting a neighboring bladed wheel 8.

An illustrative one of the variable pitch vane assemblies 10 is shown in FIGS. 2-6 and includes an outer band 12 (casing), a plurality of variable pitch vanes 14, and an inner band 16. The outer band 12 extends at least partway circumferentially around the central axis 11 to define an outer boundary of a gas path 15 of the variable pitch vane assembly 10. The plurality of variable pitch vanes 14 are configured to vary the direction of the gas flowing through the gas path 15 of the variable pitch vane assembly 10. The inner band 16 extends circumferentially at least partway about the central axis 11. The plurality of variable pitch vanes 14 extend radially between and portions of each vane 14 are received in the outer band 12 and the inner band 16.

In the illustrative embodiment, the outer band 12 is a split band that extends 180 degrees around the axis 11. Two outer band segments are coupled together to form a full 360 degree hoop for assembly and use in the gas turbine engine 110. The outer band 12 provides the outer case of the compressor 114 in the illustrative embodiment as suggested in FIG. 1. In other embodiments, the outer band 12 maybe coupled with the outer case of the compressor 114. The outer band 12 is made of aluminum in the illustrative embodiment. The outer band 12 includes a ring segment and a plurality of vane mounts configured to receive a portion of the variable pitch vanes 14 to couple the variable pitch vanes 14 with the outer band 12.

Figure 3:
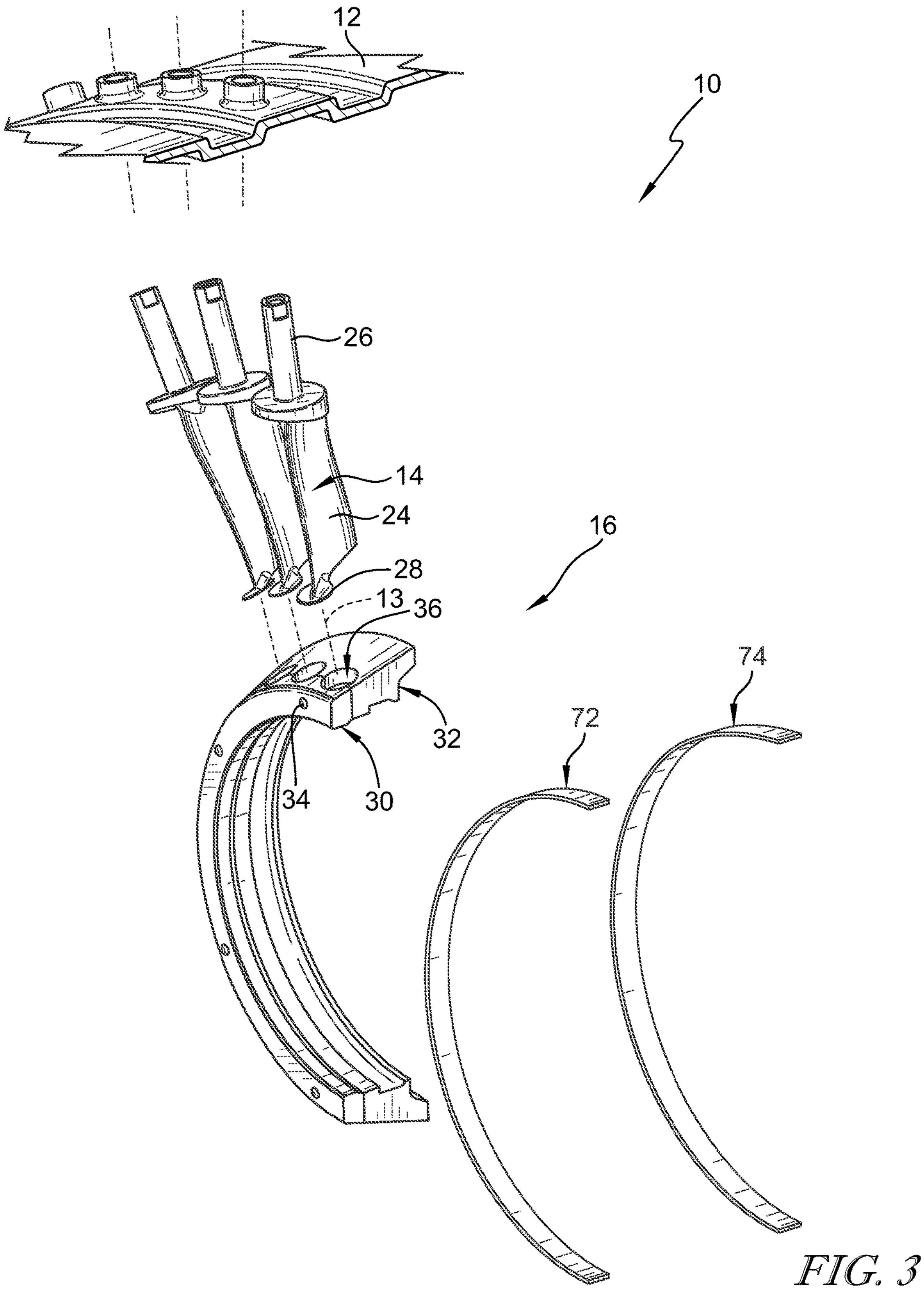
FIG. 3 is an exploded view of the variable vane assembly of FIG. 2 showing that the assembly includes an outer band arranged around a central axis, a plurality of variable pitch vanes, and a sectioned inner band having a forward ring segment, an aft ring segment, and rivets that extend through and couple the forward ring segment with the aft ring segment.

Each of the plurality of variable pitch vanes 14 extends radially inward from the outer band 12 relative to the central axis 11 as suggested in FIG. 3. Each of the plurality of variable pitch vanes 14 is configured to rotate about a pitch axis 13 that extends radially outward from the central axis 11 and through the corresponding variable pitch vane 14 so that the direction of the compressed gas being compressed by the bladed wheels 8 can be varied. Each of the plurality of variable pitch vanes 14 include an airfoil body 24, an outer support 26 that extends radially outward from the airfoil body 24 and into the vane mounts of the outer band 12, and an inner support 28 that extends radially inward from the airfoil body 24 and into the inner band 16.

The inner band 16 of the present disclosure is adapted to facilitate assembly of the variable pitch vanes 14 into the outer band 12 and the inner band 16 during assembly of the variable pitch vane assembly 10. In contrast, conventional methods of assembly may damage or permanently deform the inner band. High stress imparted onto an inner band is a potential concern with traditional assembly methods. As an example of an undesired outcome of the conventional methods, the stresses may become large enough to plastically deform the inner band or create local plasticity during installation. Such high stresses may be a concern with inner bands having small diameters or using low strength materials such as aluminum.

The inner band 16 of the present disclosure has a clamshell design that facilitates assembly and may reduce the risk of plastic deformation during assembly by minimizing or eliminating the process of radially compressing the inner band 16. The inner band 16 for the present disclosure is adapted for axial split cases and a full hoop is divided in half circumferentially to provide two segments of inner bands 16 for assembly purposes.

Figure 4:
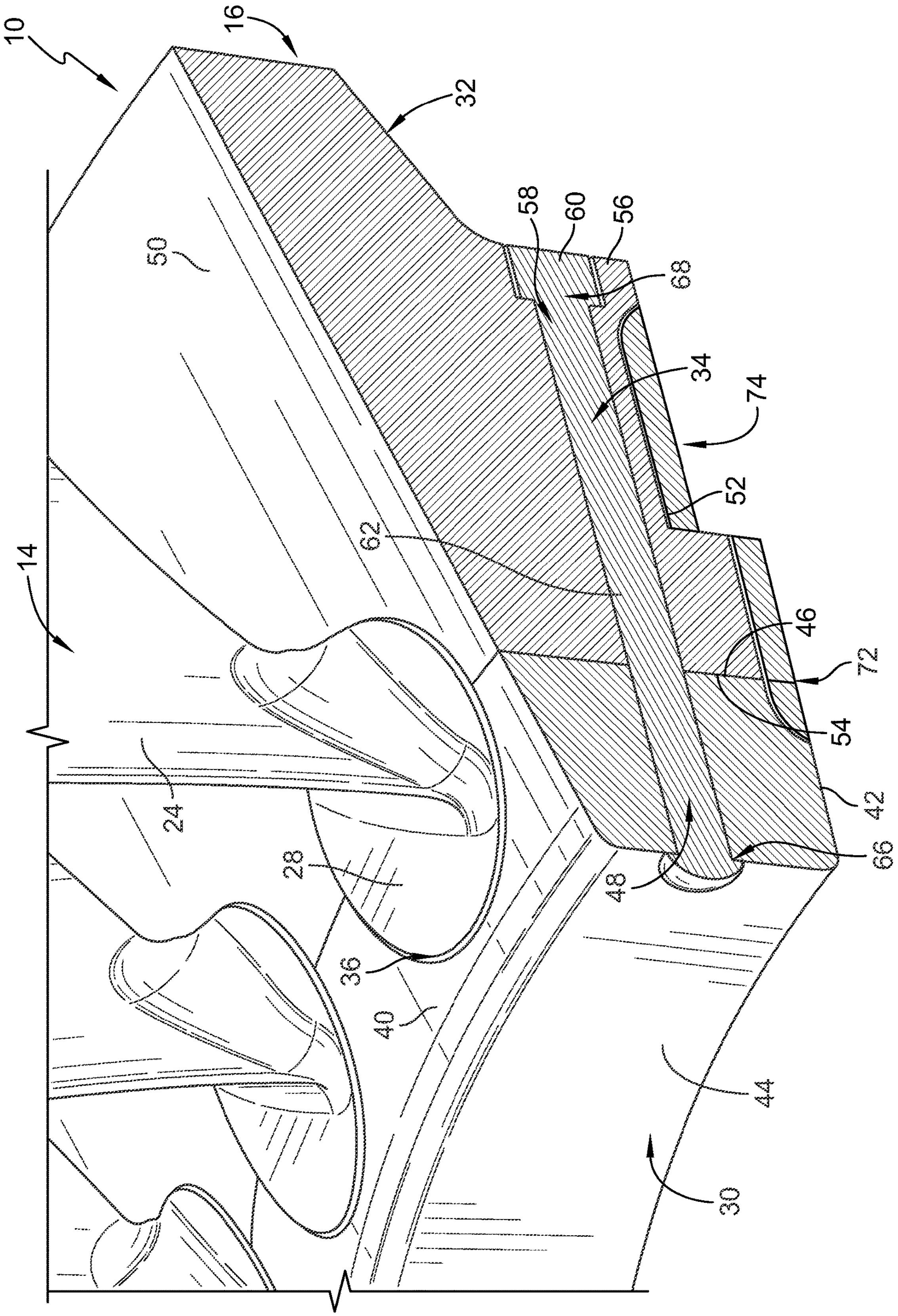
FIG. 4 is a perspective view of the variable vane assembly of FIG. 2 showing the forward ring segment and the aft ring segment cooperate to define bearing apertures whereby each bearing aperture receives one of the variable pitch vanes therein and showing one of the rivets extending axially through the forward ring segment and the aft ring segment and the rivet deformed at a forward end thereof.

The inner band 16 of the present disclosure includes a forward ring segment 30, an aft ring segment 32, and one or more rivets 34 as shown in FIGS. 3 and 4. The forward and aft ring segments 30, 32 each extends circumferentially partway about the central axis 11 about 180 degrees and receive the variable pitch vanes 14 therein. The rivet 34 extends axially through the forward ring segment 30 and the aft ring segment 32. At least one of a forward end and an aft end of the rivet 34 is plastically deformed to couple the forward ring segment 30 with the aft ring segment 32.

The forward ring segment 30 and the aft ring segment 32 cooperate to define a plurality of bearing apertures 36 that extends radially into the forward ring segment 30 and the aft ring segment 32 as shown in FIGS. 3 and 4. Each bearing aperture 64 receives a portion of a corresponding one of the variable pitch vanes 14 included in the plurality of variable pitch vanes 14. The bearing aperture 64 (counterbored hole) is drilled or otherwise formed into the ring segments 30, 32 to receive the round inner support 28. The forward ring segment 30 is formed to include a first portion of the bearing apertures and the aft ring segment 32 is formed to include a second portion of the bearing apertures.

The forward ring segment 30 has an outer radial face 40, an inner radial face 42, a forward side wall 44, and an aft side wall 46 as shown in FIG. 4. The outer radial face 40 defines a portion of the inner boundary of the gas path 15. The inner radial face 42 is spaced apart radially from the outer radial face 40 and faces the axis 11. The forward side wall 44 extends radially between and interconnects the outer radial face 40 and the inner radial face 42. The aft side wall 46 is spaced apart axially from the forward side wall 44 and extends radially between and interconnects the outer radial face 40 and the inner radial face 42. In the illustrative embodiment, the forward ring segment 30 is substantially solid material between the outer radial face 40, the inner radial face 42, the forward side wall 44, and the aft side wall 46.

The forward ring segment 30 is formed to define a passage 48 that extends axially through the forward side wall 44 and the aft side wall 46 as shown in FIG. 4. In the illustrative embodiment, the passage 48 has a single diameter as it extends axially through the forward ring segment 30. In some embodiments, the passage 48 includes a counterbore or countersink that extends axially into the forward side wall 44 and partway toward the aft side wall 46 similar to the counterbore shown in the aft ring segment 32 of FIG. 4.

The aft ring segment 32 has an outer radial face 50, an inner radial face 52, a forward side wall 54, and an aft side wall 56 as shown in FIG. 4. The outer radial face 50 defines a portion of the inner boundary of the gas path 15. The inner radial face 52 is spaced apart radially from the outer radial face 50 and faces the axis 11. The forward side wall 54 extends radially between and interconnects the outer radial face 50 and the inner radial face 52. The aft side wall 56 is spaced apart axially from the forward side wall 54 and extends radially between and interconnects the outer radial face 50 and the inner radial face 52. In the illustrative embodiment, the aft ring segment 32 is substantially solid material between the outer radial face 50, the inner radial face 52, the forward side wall 54, and the aft side wall 56.

The aft ring segment 32 is formed to define a passage 58 that extends axially through the forward side wall 54 and the aft side wall 56 as shown in FIG. 4. In the illustrative embodiment, the passage 48 has a first diameter as it extends axially through the forward ring segment 30 and a counterbore having a second diameter that extends axially into the aft side wall 56 and partway toward the forward side wall 54.

The aft side wall 46 of the forward ring segment 30 abuts the forward side wall 54 of the aft ring segment 32 to capture the vanes 14 between the forward and aft ring segments 30, 32 and couple the vanes 14 with the inner band 16 as shown in FIG. 4. In the illustrative embodiment, the aft side wall 46 directly engages the forward side wall 54. In the illustrate embodiment, the aft side wall 46 and the forward side wall 54 are planar.

The forward ring segment 30 is formed to define a first portion of the plurality of bearing apertures 36 that extend radially into the outer radial face 40 and open axially aft from the aft side wall 46. The aft ring segment 32 is formed to define a second portion of the plurality of bearing apertures 36 that extend radially into the outer radial face 50 and open axially forward from the forward side wall 54. As a result, the forward ring segment 30 and the aft ring segment 32 cooperate to define the plurality of bearing apertures 36.

The entire outer radial face 40 of the forward ring segment 30 and the entire outer radial face 50 of the aft ring segment 32 define the inner boundary of the gas path 15 as shown in FIG. 2. In other words, the compressor assembly 10 defines its portion of the inner boundary of the gas path 15 solely with the outer radial face 40 and the outer radial face 50 in the illustrative embodiment. The outer radial face 40 of the forward ring segment 30 and the outer radial face 50 of the aft ring segment 32 extend radially outward as they extend aft relative to the axis 11.

The forward side wall 44 of the forward ring segment 30 faces directly the bladed wheel 8 located axially forward of the inner band 16 as shown in FIG. 2 such that no other component is located axially between the bladed wheel 8 and the forward ring segment 30. The aft side wall 56 of the aft ring segment 32 faces directly the bladed wheel 8 located axially aft of the inner band 16 as shown in FIG. 3. The clamshell and riveted design of the present disclosure alone or in combination with one or more of these features and/or the abradable layers 72, 74 directly coupled with the ring segments 30, 32 allow the size of the inner band to be minimized and fit into an axially and radially constrained space.

The rivet 34 extends axially through the passage 48 of the forward ring segment 30 and the passage 58 of the aft ring segment 32 as shown in FIG. 4. At least one of a forward end and an aft end of the rivet 34 is plastically deformed to couple the forward ring segment 30 with the aft ring segment 32.

In the illustrative embodiment, the rivet 34 includes a head 60 and a stem 62. The stem 62 extends axially between a forward end 66 and an aft end 68 of the rivet 34. The head 60 is located at the aft end 68 of the rivet 34 in the illustrative embodiment. The stem 62 of the rivet 34 extends axially through the passage 48 and the passage 58. The stem 62, the passage 48, and the passage 58 are not threaded and the stem 62 is free to translate through the passages 48, 58 during assembly.

The head 60 is received in the bore of the passage 58 to block axial forward movement of the rivet 34 in the illustrative embodiment as shown in FIG. 4. The forward end of the stem 62 is deformed plastically to form a second head that engages the forward ring segment 30 and block aft axial movement of the rivet 34. In some embodiments, the forward ring segment 30 includes a bore and the forward end of the stem 62 of the rivet 34 is deformed to form a second head in the bore. In such embodiments, the rivet 34 may not extend axially beyond the forward side wall 44 or the aft side wall 56. In some embodiments, the rivet 34 is installed from axial forward to axial aft such that the head 60 is located forward of the forward ring segment 30. In some embodiments, the head 60 is omitted and both ends of the stem 62 are plastically deformed to couple the forward ring segment 30 with the aft ring segment 32. In some embodiments, the stem 62 is interference fit with the passages 48, 58. In some embodiments, the ring segments 30, 32 are heated and/or the rivet 34 is cooled and installed and then all allowed to return to ambient temperature so that the rivet 34 applies an axial compressive force to the forward and aft ring segments 30, 32.

Figure 5:
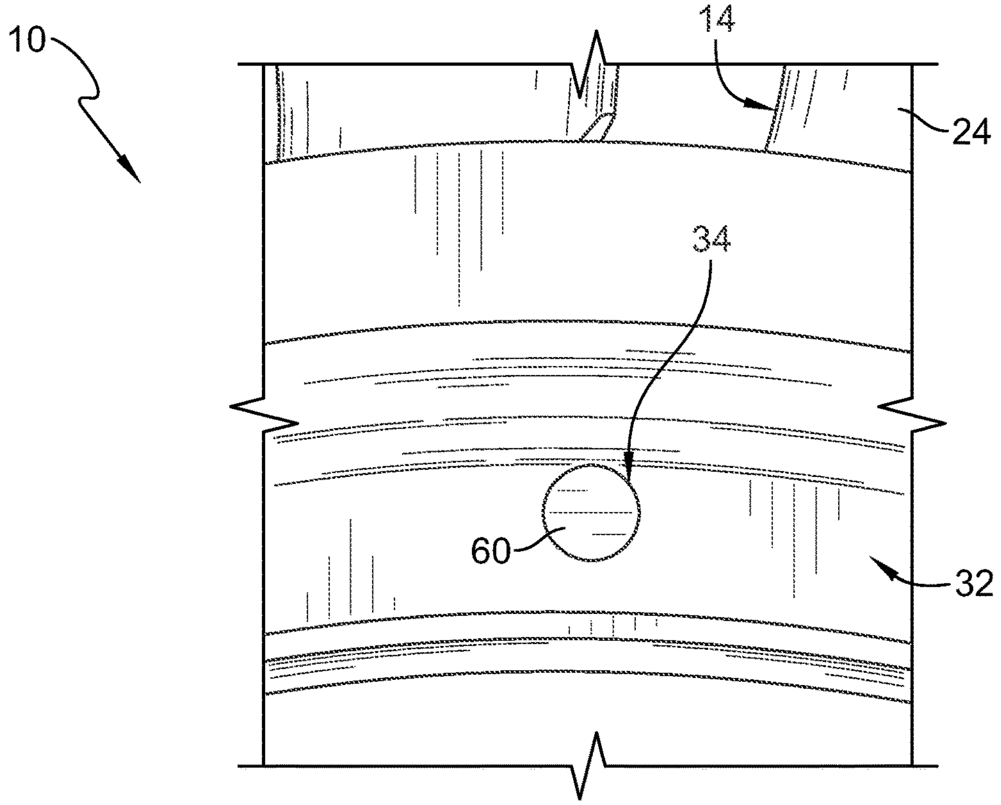
FIG. 5 is an aft elevation view of the variable vane assembly of FIG. 4 showing the rivet having a circular shaped head.
Figure 6:
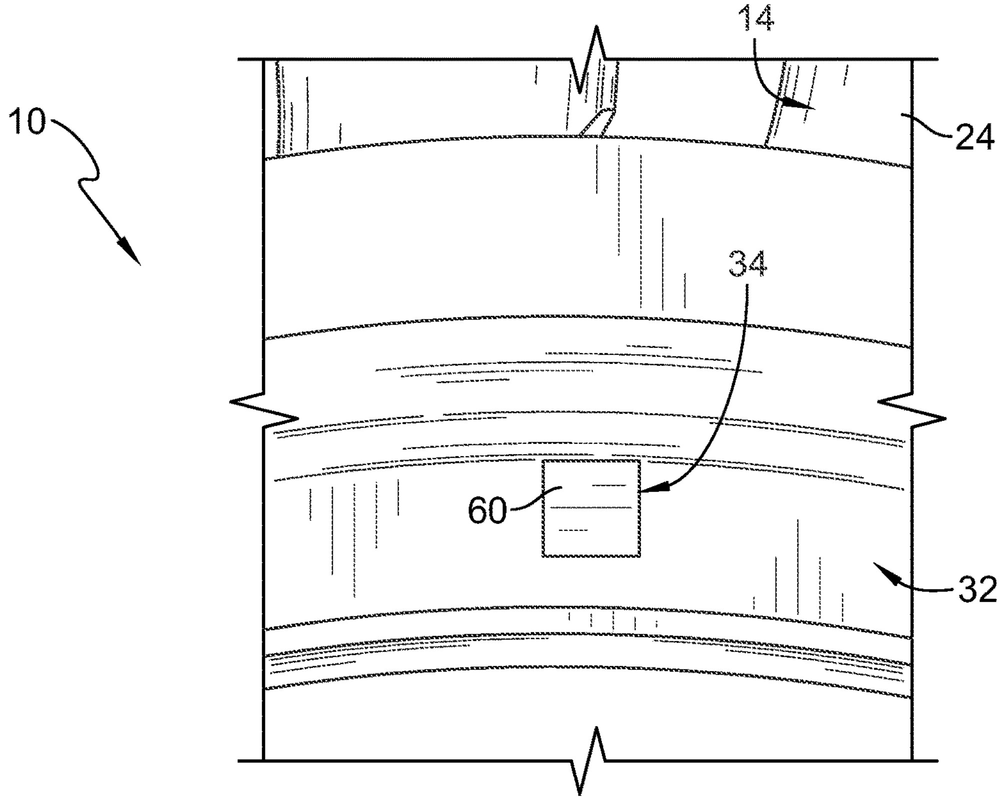
FIG. 6 is an aft elevation view of the variable vane assembly of FIG. 4 showing the rivet having a non-circular shaped head.

In the illustrative embodiment, the bore formed in the passage 58 of the aft ring segment 32 and the head 60 of the rivet 34 circular as shown in FIG. 5. In some embodiments, the bore formed in the passage 58 of the aft ring segment 32 and/or the head 60 of the rivet 34 are non-circular both when viewed axially to block rotation of the rivet 34 along a longitudinal axis of the stem 62 as shown in FIG. 6.

In the illustrative embodiment, the inner band 16 further includes abradable material for knife seals on the forward ring segment 30 and the aft ring segment as shown in FIG. 4. A first strip of abradable material 72 is applied to an inner surface of the forward ring segment 30 and the aft ring segment 32 at a first radial distance. A second strip of abradable material 74 is applied to the aft ring segment 32 at a second radial distance greater than the first radial distance. In other embodiments, the abradable material may be a single strip, multiple strips, and/or applied in other arrangements and radial distances. The abradable material is applied directly to the forward and aft ring segments 30, 32 as opposed to other external components of or around the inner band.

Fastening the two halves of the clamshell design may be difficult, for example, if a size of the inner band is small. The present disclosure uses rivets 34 or pins to couple the two halves together. The rivets 34 may have a head 60 that is received in a counterbore in one of the halves. The other side of the rivet 34 may be peened over, pressed, pulled, or otherwise deformed plastically to retain the rivet 34 in place and lock the forward ring segment 30 with the aft ring segment 32. In the illustrative embodiment, multiple rivets 34 are used.

In some embodiments, both ends of the rivet 34 are plastically deformed. In such embodiments, the counterbore may be omitted. In some embodiments, the forward ring segment 30 and the aft ring segment 32 include a counterbore and both ends of the rivet 34 are deformed within the two counterbores.

The embodiments of the present disclosure may not experience significant force loads during typical operation of the gas turbine engine 110. As a result, the axial retention force or clamping force used to secure the forward ring segment 30 and the aft ring segment 32 is minimal. The axial retention force may be selected to fix the vane spindle axis and reduce movement causing wear. In some embodiments, the axial retention force is provided by cold build also known as room temperature assembly of the components. In some embodiments, the axial retention force is provided by cooling the rivets 34 and/or heating the forward ring segment 30 and the aft ring segment 32, installing and deforming the rivets 34, and allowing the temperatures to normalize to ambient temperature.

A method of making the compressor assembly 10 includes a number of steps. A first ring segment 30, 32 is moved relative to a variable pitch vane 14 such that the variable pitch vane 14 is received in a first portion of a bearing aperture 36 formed in the first ring segment 30, 32. A second ring segment 32, 30 is moved relative to the first ring segment 30, 32 such that the variable pitch vane 14 is received in a second portion of the bearing aperture 36 formed in the second ring segment 32, 30. A rivet 34 is inserted axially through the first ring segment 30, 32 and the second ring segment 32, 30. An end of the rivet 34 is plastically deforming to couple the first ring segment 30, 32 with the second ring segment 32, 30. A layer of abradable material 72, 74 may be applied to at least one of the first ring segment 30, 32 and the second ring segment 32, 30. The rivet 34 may be machined, drilled, ground, etc. and separated from the first ring segment 30, 32 and the second ring segment 32, 30 to disassemble the variable pitch vane assembly 10.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A compressor assembly for a gas turbine engine, the compressor assembly comprising an outer band that extends at least partway circumferentially around a central axis to define an outer boundary of a gas path of the compressor assembly, a plurality of variable pitch vanes configured to vary a direction of a gas flowing through the gas path of the compressor assembly, each of the plurality of variable pitch vanes extends radially inward from the outer band relative to the central axis, and each of the plurality of variable pitch vanes being configured to rotate about a pitch axis that extends radially outward from the central axis and through the corresponding variable pitch vane included in the plurality of variable pitch vanes, and an inner band that extends circumferentially at least partway about the central axis to define an inner boundary of the gas path, the inner band formed to define a plurality of bearing apertures that each receive a portion of one of the plurality of variable pitch vanes, and the inner band includes a forward ring segment that extends partway circumferentially about the axis, an aft ring segment that extends partway circumferentially about the axis, and a rivet that extends axially entirely through the forward ring segment and the aft ring segment and wherein at least one of a forward end and an aft end of the rivet is plastically deformed to couple the forward ring segment with the aft ring segment, wherein a layer of abradable material is coupled to a radial inner surface of the forward ring segment and a radial inner surface of the aft ring segment.

2. The compressor assembly of claim 1, wherein the rivet includes a stem that extends axially between the forward end and the aft end of the rivet, the forward ring segment is formed to include a forward axial passage, the aft ring segment is formed to include an aft axial passage, the stem of the rivet extends axially through the forward axial passage and the aft axial passage, and wherein the stem, the forward axial passage, and aft axial passage are not threaded.

3. The compressor assembly of claim 1, wherein one of the forward ring segment and the aft ring segment is formed to define a bore that extends axially into the one of the forward ring segment and the aft ring segment and the rivet includes a stem that extends axially through the forward ring segment and the aft ring segment and a head that is received in the bore to block axial movement of the rivet.

4. The compressor assembly of claim 3, wherein the other one of the forward ring segment and the aft ring segment is formed to define a through hole and the stem of the rivet is plastically deformed and engages the other one of the forward ring segment and the aft ring segment to couple the forward ring segment with the aft ring segment.

5. The compressor assembly of claim 3, wherein at least one of the bore and the head of the rivet are non-circular when viewed axially to block rotation of the rivet along a longitudinal axis of the stem.

6. The compressor assembly of claim 1, wherein the forward ring segment and the aft ring segment cooperate to define the plurality of bearing apertures and abut one another axially to couple the plurality of variable pitch vanes with the inner band.

7. The compressor assembly of claim 6, wherein an entire outer radial face of the forward ring segment and an entire outer radial face of the aft ring segment define the inner boundary.

8. The compressor assembly of claim 1, wherein the rivet includes a stem, the at least one of a forward end and an aft end that is plastically deformed to provide a first head of the rivet, and a second head provided at the other of the forward end and the aft end, and the first head and the second head are spaced apart axially by a distance such that the first head and the second head apply an axially compressive force to the forward ring segment and the aft ring segment.

9. A compressor assembly for a gas turbine engine, the compressor assembly comprising a variable pitch vane that extends radially relative to a central axis, and an inner band that includes a first ring segment that extends partway circumferentially about the axis, a second ring segment that extends partway circumferentially about the axis and abuts the first ring segment such that a portion of the variable pitch vane is received in the first ring segment and the second ring segment, and a rivet that extends axially through the first ring segment and the second ring segment to couple the first ring segment with the second ring segment, wherein the first ring segment is formed to define a bore that extends axially into the first ring segment and the rivet includes a stem that extends axially through the first ring segment and the second ring segment and a head that is received in the bore to block axial movement of the rivet.

10. The compressor assembly of claim 9, wherein an end of the rivet is plastically deformed to couple the first ring segment with the second ring segment.

11. The compressor assembly of claim 9, wherein the rivet applies an axially compressive force to the first ring segment and the second ring segment.

12. The compressor assembly of claim 9, wherein a layer of abradable material is coupled to a radial inner surface of the first ring segment and a radial inner surface of the second ring segment.

13. The compressor assembly of claim 9, wherein an entire outer radial face of the first ring segment and an entire outer radial face of the second ring segment define an inner boundary of a gas path of the compressor assembly.

14. The compressor assembly of claim 9, wherein the rivet extends axially through the entire first ring segment and the entire second ring segment.

15. The compressor assembly of claim 9, wherein the first ring segment includes a radial inner first surface and a radial inner second surface that is spaced apart radially from the radial inner first surface and a first layer of abradable material extends along the first surface and a second layer of abradable material extends along the second surface.

16. A method of making a compressor assembly, the method comprising moving a first ring segment relative to a variable pitch vane such that the variable pitch vane is received in a first portion of a bearing aperture formed in the first ring segment, moving a second ring segment relative to the first ring segment such that the variable pitch vane is received in a second portion of the bearing aperture formed in the second ring segment, inserting a rivet axially through the first ring segment and the second ring segment, and plastically deforming an end of the rivet to couple the first ring segment with the second ring segment, further comprising applying a layer of abradable material to the first ring segment and the second ring segment such that the layer of abradable material is coupled to a radial inner surface of the first ring segment and a radial inner surface of the second ring segment.

17. The method of claim 16, further comprising machining the rivet and separating the rivet from the first ring segment and the second ring segment.

18. The method of claim 16, wherein one of the first ring segment and the second ring segment is formed to define a bore that extends axially into the one of the first ring segment and the second ring segment and the rivet includes a stem that extends axially through the first ring segment and the second ring segment and a head that is received in the bore to block axial movement of the rivet.

19. The method of claim 16, wherein the radial inner surface of the first ring segment is spaced apart radially from the radial inner surface of the second ring segment.

* * * * *